United States Patent
Gu et al.

(10) Patent No.: US 10,645,931 B2
(45) Date of Patent: May 12, 2020

(54) EXTENDED RELEASE FORMULATION

(71) Applicant: WELLMARK INTERNATIONAL, Schaumburg, IL (US)

(72) Inventors: George Gu, Dallas, TX (US); Min Xie, Schaumburg, IL (US); Keith Haas, Schaumburg, IL (US); Doug Vangundy, Schaumburg, IL (US)

(73) Assignee: WELLMARK INTERNATIONAL, Schaumburg, IL (US)

( * ) Notice: Subject to any disclaimer, the term of this patent is extended or adjusted under 35 U.S.C. 154(b) by 0 days.

(21) Appl. No.: 15/455,547

(22) Filed: Mar. 10, 2017

(65) Prior Publication Data

US 2018/0168162 A1 Jun. 21, 2018

Related U.S. Application Data

(60) Provisional application No. 62/434,968, filed on Dec. 15, 2016.

(51) Int. Cl.
| | | |
|---|---|---|
| *A01N 49/00* | (2006.01) | |
| *A01N 25/10* | (2006.01) | |
| *A01N 25/12* | (2006.01) | |
| *B01J 2/22* | (2006.01) | |
| *B01J 2/28* | (2006.01) | |

(52) U.S. Cl.
CPC ............ *A01N 49/00* (2013.01); *A01N 25/10* (2013.01); *A01N 25/12* (2013.01); *B01J 2/22* (2013.01); *B01J 2/28* (2013.01)

(58) Field of Classification Search
CPC ........ A01N 49/00; A01N 25/10; A01N 25/12; B01J 2/22; B01J 2/28
USPC ....................................................... 504/101
See application file for complete search history.

(56) References Cited

U.S. PATENT DOCUMENTS

| | | |
|---|---|---|
| 4,708,874 A | 11/1987 | De Haan et al. |
| 4,774,090 A | 9/1988 | Fekete et al. |
| 5,688,509 A | 11/1997 | Radwan et al. |
| 5,977,023 A | 11/1999 | Inoue et al. |
| 7,196,116 B1 | 3/2007 | Wilkins et al. |
| 2007/0072775 A1 | 3/2007 | Van Boxtel-Verhoeven et al. |
| 2009/0269382 A1 | 10/2009 | Mulqueen et al. |
| 2009/0286682 A1* | 11/2009 | Dairiki .................. A01N 25/04 504/124 |
| 2012/0156273 A1 | 6/2012 | Gutsmann et al. |
| 2013/0216696 A1* | 8/2013 | Taft ........................ A01C 1/06 427/4 |
| 2013/0244880 A1* | 9/2013 | Burnet .................. A01N 25/10 504/360 |
| 2016/0345584 A1* | 12/2016 | Barrett .................. A01N 63/02 |

OTHER PUBLICATIONS

Valent Biosciences Corp.; Meta Larv® S-PT Mosquito Growth Regulator; Specimen label; Sep. 2012; 2 pages.
Valent Biosciences Corp.; Metalarv S-PT Mosquito Growth Regulator Spherical Pellet; Safety Data Sheet; Feb. 26, 2016; 10 pages.
Wellmark International; Altosid Pellets Mosquito Growth Regulator; Specimen label; May 2010; 2 pages.
Wellmark International; Safety Data Sheet—Zoecon Altosid Pellets; Jun. 22, 2015; 8 pages.
PCT Application No. PCT/US2017/065141, International Search Report and Written Opinion, dated Apr. 13, 2018, 11 pages.

* cited by examiner

*Primary Examiner* — Johann R Richter
*Assistant Examiner* — Courtney A Brown
(74) *Attorney, Agent, or Firm* — Kilpatrick Townsend & Stockton LLP

(57) ABSTRACT

The present invention provides an extended release insecticide formulation, the formulation comprising: an insecticide on a substrate; a lipophilic wax, wherein the insecticide is incorporated into the wax forming a matrix; a release retarding polymer in the matrix; and a rate extending polymer embed the matrix. Methods of making the formulation and use of the formulation are also provided.

10 Claims, 3 Drawing Sheets

EXTENDED RELEASE FORMULATION

CROSS-REFERENCE TO RELATED APPLICATIONS

Figure 1:
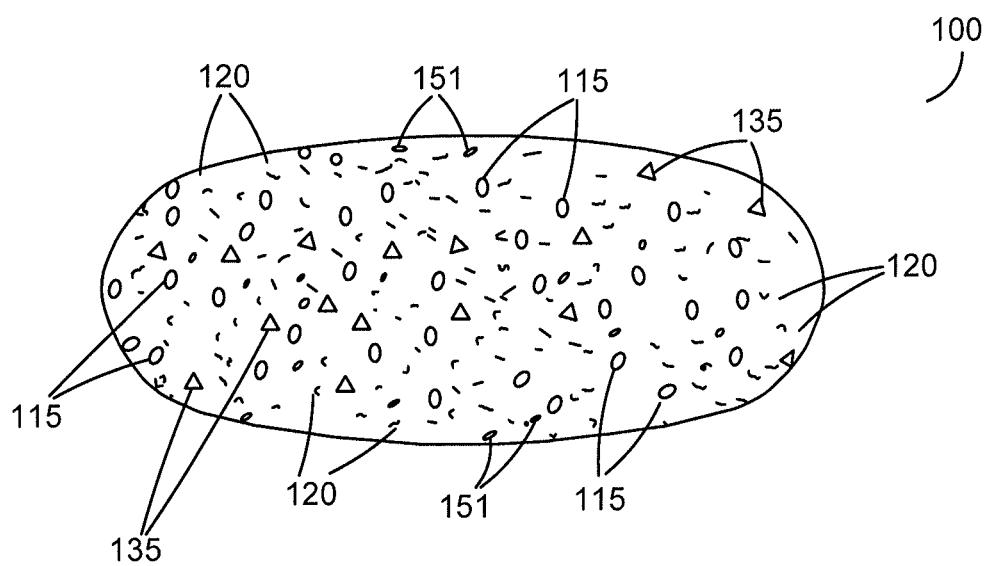

The present application claims priority to U.S. Application No. 62/434,968, filed Dec. 15, 2016, the contents of which are incorporated herein by reference for all purposes.

BACKGROUND OF THE INVENTION

An aquatic environment provides mosquitoes with a place to lay eggs, grow and develop through their egg, larvae and pupal stages. Mosquitoes prefer stagnant water as a locus to lay their eggs. They commonly infest small bodies of water including ponds, stagnant creek areas, marshes, drain ditches, swamps and other wetland habitats. Many species of mosquitoes use containers of water as egg-deposit sites. Adults emerge from pupal cells, fly, rest then feed, mate, lay eggs, and may feed again (depending on group); oviposition is part of the airborne portion of their lifecycle. Water habitat is an excellent locus because that is where the larvae must reside, and certain insecticides kill the larvae and pupae, not the adults.

An insecticide needs to be at a certain concentration in a water column to maintain efficacy and prevent or retard mosquito larvae emergence. However, some insecticides are unstable in aqueous medium and may degrade in water. If the formulation requires a controlled release of the insecticide, it is possible that the insecticide can retain its potency and stability for a longer period of time.

There is a need in the art for new formulations that have long-lasting efficacy. Further, there is a need for formulations that slowly release an insecticide, and thus increase the insecticide's chemical stability in water. The present invention satisfies these and other needs.

BRIEF SUMMARY OF THE INVENTION

In one embodiment, the present invention provides an extended release insecticide formulation, the formulation comprising, or consisting essentially of, or consisting of:

a matrix comprising an insecticide incorporated into a lipophilic wax applied on a substrate; and a release retarding polymer together with a rate extending polymer uniformly embedded in the matrix.

In certain aspects, the insecticide is an insect growth regulator (IGR). Typical IGRs include methoprene, hydroprene, kinoprene, fenoxycarb, pyriproxifen, cyromazine, dimilin, novaluron and mixtures thereof. Preferably, the insect growth regulator is methoprene.

In another embodiment, the present invention provides a method of making an extended release insecticide formulation, the method comprising, or consisting essentially of, or consisting of:

i) admixing an insecticide with a lipophilic wax with optional heating to form an admixture of insecticide and a lipophilic wax;

ii) contacting the admixture of insecticide and the lipophilic wax to a substrate forming a matrix;

iii) admixing an erodible powder, a release retarding polymer and a rate extending polymer to embed the matrix to form a powder;

iv) adding a binder with water to the powder to form a dough; and v) forming a granule from the dough using a granulator.

In certain aspects, the insecticide is an insect growth regulator (IGR).

In yet another embodiment, the present invention provides a method for eradicating an insect, the method comprising, or consisting essentially of, or consisting of:

contacting an insect with an extended release insecticide formulation, the formulation comprising:

an insecticide on a substrate;

a lipophilic wax, wherein the insecticide is incorporated into the wax forming a matrix; a release retarding polymer in the matrix; and a rate extending polymer embedded in the matrix, to thereby eradicate the insect.

In certain aspects, the insecticide is an insect growth regulator (IGR).

These and other aspects, objects and embodiments will become more apparent when read with the accompanying drawings and detailed description which follows.

BRIEF DESCRIPTION OF THE DRAWINGS

FIG. 1 illustrates one embodiment of a formulation of the present invention.

FIG. 2 illustrates one embodiment of making a formulation of the present invention.

FIG. 3 illustrates efficacy of certain embodiments of the present invention.

DETAILED DESCRIPTION OF THE INVENTION

I. Definitions

The terms "a," "an," or "the" as used herein not only include aspects with one member, but also include aspects with more than one member. For example, an embodiment including "a binding agent" should be understood to present certain aspects with one or more binding agents.

"About" as used herein applies to a defined range around a numerical value. When "X" is a numerical value, "about X," generally indicates a value from 0.95X to 1.05X. Any reference to "about X" specifically indicates at least the values X, 0.95X, 0.96X, 0.97X, 0.98X, 0.99X, 1.01X, 1.02X, 1.03X, 1.04X, and 1.05X. Thus, "about X" is intended to imply and provide written description support for a claim limitation of, e.g., "0.98X."

II. Formulation

In one embodiment, the present invention provides an extended release insecticide formulation, the formulation comprising, or consisting essentially of, or consisting of:

a matrix comprising an insecticide incorporated into a lipophilic wax applied on a substrate; and a release retarding polymer together with a rate extending polymer uniformly embedded in the matrix.

In certain aspects, the insecticide is an insect growth regulator (IGR). Insect growth regulators (including juvenile hormones) are well known for their use and efficacy in controlling or eliminating insect infestation in humans, in animals, and in both residential and industrial environments. Many types of insects are controllable by insect growth regulators, including flies (e.g., face flies, house flies, stable flies and horn flies), fleas, mosquitoes, flour beetles, cigarette beetles, and cockroaches. The regulators vary widely in chemical composition, and two of the more prominent classes are 2,4-dienoic acids and phenoxyphenoxy compounds, particularly phenoxyphenoxyalkoxyheterocyclics, as well as benzoylureas and triazine derivatives. Examples of 2,4-dienoic acids and related compounds are methoprene, hydroprene, neotenin, and epiphenonane. As used herein, "methoprene" includes R-methoprene, S-methoprene and mixtures of R and S methoprene. S-methoprene is the preferred methoprene. Examples of phenoxyphenoxy compounds are fenoxycarb and pyriproxyfen. Examples of benzoylureas are lufenuron, diflubenzuron, terflubenzuron, triflumaron, hexaflumaron, and flucycloxuron. An example of a triazine derivative is 2-cyclopropylamino-4,6-bis(dimethylamino)-s-triazine.

Useful IGRs include methoprene, hydroprene, kinoprene, fenoxycarb, pyriproxifen, cyromazine, dimilin, novaluron and mixtures thereof. One preferred insect growth regulator is methoprene.

The following IGR are suitable for the present invention. Chitin synthesis inhibitors are suitable such as bistrifluron, buprofezin, chlorfluazuron, cyromazine, diflubenzuron, flucycloxuron, flufenoxuron, hexaflumuron, lufenuron, novaluron, noviflumuron, penfluron, teflubenzuron, and triflumuron. In addition, juvenile hormone mimics are suitable such as epofenonane, fenoxycarb, hydroprene, kinoprene, methoprene, pyriproxyfen, and triprene. Further, juvenile hormones are suitable such as juvenile hormone I, juvenile hormone II, and juvenile hormone III. Other suitable IGRs include, molting hormone agonists, chromafenozide, halofenozide, and methoxyfenozide tebufenozide. Moreover, molting hormones such as α-ecdysone, and ecdysterone are suitable. In addition, molting inhibitors such as diofenolan and other IGRs, which include precocenes, such as precocene I, precocene II, and precocene III are suitable. Finally, unclassified insect growth regulators are suitable such as dicyclanil. Preferred IGRs include methoprene, hydroprene, kinoprene, fenoxycarb, pyriproxifen, and mixtures thereof. In a preferred embodiment, methoprene is the IGR of choice.

In certain aspects, the insecticide is present in the formulation at between about 0.1% to about 20% w/w, such as 1, 2, 3, 4, 5, 6, 7, 8, 9, 10, 11, 12, 13, 14, 15, 16, 17, 18, 19 or about 20%. In certain aspects, the insecticide is present at about 0.1% to 10%, or about 0.1% to about 8% or about 1% to 8% w/w.

In certain aspects, the insecticide is incorporated into a lipophilic wax. The lipophilic wax and insecticide can form a matrix. The matrix can be applied to a substrate. The substrate can be for example, silica. Other substrates include, sand, limestone, corncob, a plant fiber granule, diatomaceous earth, a clay and combinations thereof. In certain aspects, the substrate can ensure an even distribution onto a use locus, such as a body of water.

One embodiment of a formulation 100 of the present invention is shown in FIG. 1. An insecticide is admixed with a lipophilic wax. Suitable lipophilic waxes include an animal wax, a vegetable wax, a petroleum wax, a hydrogenated vegetable oil, or a polyethylene polymer. The wax and insecticide admixture is then applied to a substrate to form a matrix 115. In certain instances, the admixture of insecticide and lipophilic wax is sprayed onto the substrate. The matrix is thereafter mixed with an erodible powder 120 and a release retarding polymer 135. The matrix 115 further comprises a rate extending polymer 151 embedded within the matrix. Although the figure depicts components as being discrete, the components are homogeneously mixed and are uniform throughout the dough when granulated.

In certain aspects, the wax is present in about 1% to about 20% w/w such as 1, 2, 3, 4, 5, 6, 7, 8, 9, 10, 11, 12, 13, 14, 15, 16, 17, 18, 19 or about 20% of the composition. In certain aspects, the lipophilic wax is present at about 1% to 10%, or about 1% to about 8% or about 1% to 15% w/w.

The formulation contains a release retarding polymer. In certain aspects, the release retarding polymer is selected from guar gum, xanthan gum, polyurethanes, gelatins, hydroxypropylmethylcellulose, sodium carboxymethylcellulose, methylcellulose, ethylcellulose, hydroxyethylcellulose, hydroxypropylcellulose, hydroxyethylmethylcellulose, hydroxypropylethylcellulose, and a combination thereof. In one aspect, the release retarding polymer is xanthan gum.

In certain other aspects, the release retarding polymer is present from about 1% to about 20% w/w such as 1, 2, 3, 4, 5, 6, 7, 8, 9, 10, 11, 12, 13, 14, 15, 16, 17, 18, 19 or about 20% of the composition. In certain aspects, the release retarding polymer is present at about 1% to 10%, or about 1% to about 8% or about 1% to 15% w/w of the composition.

In certain other aspects, the extended release insecticide formulation further comprises a binder such as polyvinyl alcohol (PVA) or a gelatin water solution (e.g., fish gelatin). One of skill in the art will know of other suitable binders for the present invention.

In certain other aspects, the binder is present from about 1% to about 15% w/w such as 1, 2, 3, 4, 5, 6, 7, 8, 9, 10, 11, 12, 13, 14, or about 15% of the composition. In certain aspects, the binder is present at about 1% to 10%, or about 1% to about 8% or about 1% to 15% w/w of the composition.

In certain aspects, the matrix of the extended release insecticide formulation comprises a water erodible powder. Suitable erodible powders include clay, bentonite, montmorillonite, calcium carbonate or calcium sulfate. In one aspect, the erodible powder is calcium sulfate ($CaSO_4$). In other aspects, the erodible powder is magnesium sulfate ($MgSO_4$). In other aspects, Be, Mg, Ca, Sr, or Ba sulfates can be used.

Typically, the erodible powder is present from about 50% to about 85% w/w. In certain aspects, the erodible powder is present from about 50, 55, 60, 65, 70, 75, 80 or about 85% w/w. In certain aspects, the erodible powder is present from about 50 to 85%; or about 50 to 80%; or about 50 to 75%; or about 50 to 70%; or about 50 to 60% w/w.

In certain aspects, a rate extending polymer is embedded in the matrix. The rate extending polymer is a water soluble material or partially water soluble material. Suitable materials include, but are not limited to, polyurethanes, gelatins, hydroxypropylmethylcellulose, sodium carboxymethylcellulose, methylcellulose, hydroxyethylcellulose, hydroxypropylcellulose, hydroxyethylmethylcellulose, hydroxypropylethylcellulose, carbopol, polyvinyl alcohol, dextran, chitosan, starches, polyacrylamides, polyacrylates, agar, collagen, fibronectin, alginic acid, sodium alginate, pectin, hyaluronic acid, and a combination thereof. In one aspect, the rate extending polymer can be sodium alginate. In certain aspects, the rate extending polymer can encapsulate the granule.

In certain aspects, the rate extending polymer is present from about 1% to about 10% w/w such as 1, 2, 3, 4, 5, 6, 7, 8, 9 or about 10% w/w of the composition.

In certain aspects, the formulations of the present invention further comprise an antioxidant. Suitable antioxidants include, but are not limited to, tocopherol, ascorbyl palmitate, propyl gallate, butylated hydroxyanisole (BHA), butylated hydroxytoluene (BHT), and combinations thereof. In certain aspects, the ratio of the antioxidant to insecticide is about 0.001% w/w to about 2% w/w, preferably about 0.01% to about 1% w/w, and more preferably, about 0.1% to about 0.5% w/w.

III. Methods of Making

In one embodiment, the present invention provides a method of making an extended release insecticide formulation, the method comprising, consisting essentially of, or consisting of:
i) admixing an insecticide with a lipophilic wax with optional heating to form an admixture of insecticide and lipophilic wax;
ii) contacting the admixture of insecticide and lipophilic wax to a substrate forming a matrix;
iii) admixing an erodible powder, a release retarding polymer and a rate extending polymer embed the matrix to form a powder;
iv) adding a binder with water to the powder to form a dough; and
v) forming a granule from the dough using a granulator.

As discussed above, various insecticides can be used in the methods of the present invention. In certain instances, a useful insecticide is an IGR. Suitable IGRs include methoprene, hydroprene, kinoprene, fenoxycarb, pyriproxifen, cyromazine, dimilin, novaluron and mixtures thereof. One preferred insect growth regulator is methoprene.

The pills or granules comprise an insecticide (e.g., methoprene) incorporated into a hydrophobic or lipophilic wax, which admixture slows the release of the insecticide (e.g., methoprene). This methoprene and wax mixture can be further mixed with a calcium alginate gel and one or more rate retarding polymers, such as xanthan gum. All the components in the matrix are well mixed to ensure the uniformity and consistency. The final products are dust free and uniform granules. The product provides uninterrupted and even distribution in a field application.

Figure 2:
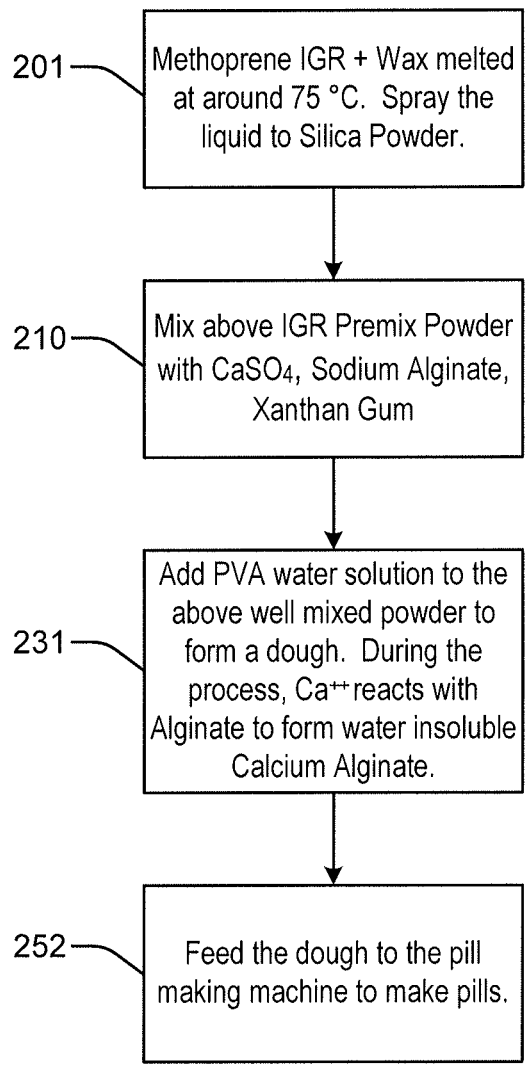

Turning now to FIG. 2 and by way of an example and not to be limiting, in step 201, methoprene is added to a hot lipophilic wax such as paraffin. The temperature of the wax should be above its melting point, such as just above its melting point. Lipophilic waxes include animal waxes, vegetable waxes, petroleum waxes, hydrogenated vegetable oils, or a polyethylene polymer. This admixture of insecticide and lipophilic wax is then sprayed on silica or sand or a substrate. In fact, the admixture of insecticide and lipophilic wax sprayed onto a substrate forms a matrix.

In step 210, an erodible powder such as calcium sulfate is admixed with a release retarding polymer and a rate extending polymer embed the matrix to form a powder. The powder is then well mixed.

Next, in step 231, a binder such as PVA is added with water to the powder to form a dough. Without being bound to theory, it is believed that in certain instances, the calcium ion reacts with alginate to form calcium alginate which is insoluble in aqueous medium.

In step 252, the dough is used in a granulator to form a pill or granule. The pills or granules comprise methoprene incorporated into a hydrophobic or lipophilic wax, which slows the release of methoprene.

Various granulators or pill generators can be used. Typically, the granulator can use the dough as described as a feedstock and granulate and compress the dough into a granule that can be used in the field.

IV. Method of Use

In one embodiment, the present invention provides a method for eradicating an insect, the method comprising: contacting the insect with an extended release insecticide formulation, the formulation comprising:
an insecticide on a substrate;
a lipophilic wax, wherein the insecticide is incorporated into the wax forming a matrix; a release retarding polymer in the matrix; and a rate extending polymer embedded in the matrix, to thereby eradicate the insect.

The control of insect populations can be maintained over varying time frames, depending on the insect season and the surface area and composition of the granules or pills distributed in the environment. Quite advantageously, protection using the formulations of the present invention can be maintained for 28-50 days, such as 30-45 days or 35-45 days.

The Table below shows application sites and rates.

TABLE 1

| Mosquito Habitat | Rate (LB/acre) |
|---|---|
| Floodwater sites such as pastures, meadows, rice fields, freshwater swamps and marshes, salt and tidal marshes, cattail marshes, woodland pools, floodplains, tires, other artificial water-holding containers | 2.5-5 |
| Floodwater sites such as dredging spoil sites, waste treatment and settling ponds, ditches and other manmade depressions | 5-10 |
| Permanent water sites such as ornamental ponds and fountains, fish ponds, cattail marshes, water hyacinth beds, flooded crypts, transformer vaults, abandoned swimming pools, construction and other manmade depressions, treeholes, other artificial water holding containers | 2.5-5 |
| Permanent water sites such as storm drains, catch basins, roadside ditches, cesspools, septic tanks, waste settling ponds, vegetation-choked phosphate pits | 5-10 |

The pest control pills or granules can be applied to a site using the rates above. In certain instances, each granule weights about 10-100 mg, or about 20-80 mg, or about 30-50 mg. Commonly, the spacing of the pills or granules at the breeding site can be about 1 to 30 feet between granule, preferably about 5 to 25 feet, and more preferably about 7 to 12 feet, or about every 5-7 feet. The even distribution of the granules or pills can be important in controlling mosquitoes through likely breeding territories where the topography is substantially unknown. In certain areas where the topography is more familiar, such a uniform distribution scheme is not absolutely necessary. In large areas of known topography where substantial water accumulates, it is important to introduce a sufficient number of granules to provide a pest controlling amount of pesticide to the water. However, the granules do not have to be uniformly distributed.

The granules or pills can be distributed into the environment by hand, from ground vehicles or boats, by helicopter or other aircraft, or by any other means insuring a fairly even distribution of the pest control means into the environment. The granules of the invention can be distributed into any environmental location which is seasonally flooded or contains standing water during a substantial portion of the season. Typical wetland areas which can be treated using the formulation of the invention are seasonally flooded basin or flat sites typical of woodland areas having few aquatic plants or grasses. Such sites generally are flooded during the wetter periods of the temperate season.

The formulation can also be used in any of a variety of other wetland areas such as, for example, inland fresh meadow areas that contain standing water for greater periods of time during the year and are commonly characterized by the presence of reeds, canary grass, or other plants common in a wetter environment; inland shallow fresh water marshes that are commonly muddy throughout the growing season with about 6 inches of water, commonly characterized by the presence of cattail ranks and grass across geographically depressed areas; inland deep water, fresh water marshes that commonly have water all year round, with pockets of open water permitting submerged aquatic plants to grow, and can have as much as six inches to three feet of water permanently present; inland open fresh water such as game lakes that commonly have fresh water present at depths of greater than 10 feet, and can be characterized by depths free of vegetation, while vegetation is commonly present in the shallows or at the water edge. The formulation can be used in any of the above wetland areas in order to control pest populations. Mosquitoes, for example, are most commonly produced in areas that are seasonally flooded or where the water depth fluctuates.

The granules can be applied to an environment that is substantially dry or wet. In a dry environment (no standing water) atmospheric humidity will result in little or no pesticide release. In wet environments (standing water) where the pest control means is immersed, water that induces erosion and/or slow release will generally be environmental standing water. One skilled in the art understands that decomposition is generally favored and is most efficient in the presence of standing water.

V. Examples

Example 1

In this comparative example, liquid methoprene was mixed into a calcium alginate gel. There is no wax or xanthan gum in this formulation.

| Ingredient | Percent of Formulation |
| --- | --- |
| Liquid methoprene (90%) | 4.92% w/w |
| $CaSO_4$ | 82.18% w/w |
| Polyvinyl alcohol (PVA) | 8.24% w/w |
| sodium alginate | 4.67% w/w |
| | 100% |

The field efficacy of this formulation was only 3 weeks (21 days) of inhibition.

Example 2

In this example, methoprene was incorporated into a wax matrix and thereafter mixed into calcium alginate gel, with no xanthan gum.

| Ingredient | Percent of Formulation |
| --- | --- |
| Methoprene wax (30%) Silica premix | 14.99% |
| $CaSO_4$ | 73.46% |
| PVA | 6.50% |
| NA alginate | 5.05% |
| | 100% |

The field efficacy was 4 weeks (28 days) of inhibition.

Example 3

The formulations in these examples include a rate retarding polymer such as xanthan gum, and the efficacy was increased further.

| | 163B | 169B | 171B | 192A | 192B |
| --- | --- | --- | --- | --- | --- |
| Methoprene-Wax Silica premix | 15.00% | 15.00% | 15.00% | 14.50% | 14.50% |
| $CaSO_4$ | 73.50% | 73.00% | 73.30% | 73.50% | 73.00% |
| Na alginate | 5.00% | 5.00% | 4.50% | 4.50% | 4.50% |
| Xanthan Gum | 0.00% | 0.50% | 0.70% | 1.00% | 1.50% |
| PVA | 6.50% | 6.50% | 6.50% | 6.50% | 6.50% |
| | 100.00% | 100.00% | 100.00% | 100.00% | 100.00% |

In certain aspects, methoprene is present at a certain concentration in the water column to maintain about 90% plus larvae emergence inhibition. Methoprene is not stable in water, and thus a controlled release methoprene formulation increases its stability. In certain aspects, methoprene release from granule matrix involves erosion of matrix, dissolution of methoprene and diffusion from matrix. The $CaSO_4$ is water soluble and erodes in water.

It is believed that sodium alginate forms a water insoluble calcium alginate gel to retard the erosion process. Methoprene is incorporated into wax matrix to slow down its dissolution process. A rate retarding polymer, such as xanthan gum is added to retard the diffusion process.

Example 4

This example shows the superior efficacy (inhibition) of the formulation against *Anopheles quadrimaculatus* compared to other formulations when delivered at a rate of 5 lb. at 12" of water.

Formulations

TABLE 2

|  | 169B inventive | 171B inventive | 192A inventive | 192B inventive | Altosid pellet comparative | Metalav; S-PT comparative |
| --- | --- | --- | --- | --- | --- | --- |
| Xanthan Gum % | 0.50% | 0.70% | 1.00% | 1.50% | None | None |
| Methoprene % | 4.39% | 4.52% | 4.29% | 4.34% | 4.25% | 4.20% |

General Procedures:
a. Containers were filled with de-chlorinated water. Micro-nutrients were added to test arenas to model typical field habitat for the test system.
b. Microcosms/test arenas were flooded to a water depth of 12".
c. Nutrients are added to each artificial pond for mosquito diet as needed.
d. Treatments are randomly assigned.
e. The non-treated test substance means that it was not treated with an insecticide. Treated and control groups have 5 replications.
f. Each container is infested with 150-350, 2nd or 3rd instar larvae.

Percent Emergence Inhibition
a. Pupae were collected at seven day intervals following the initial treatment and flooding of the test arena.
b. Following pupae collections, the pupae from each artificial pond were placed in a labeled dated container, the container contains water from the collection site. If necessary, distilled water is used to hold the pupae until emergence.
c. Pupae are returned to the collection containers to the laboratory. Containers are placed in a sheltered, protected area, and the pupae are allowed to complete their development. Five to seven days is sufficient to allow all adults to emerge or not to emerge as may be the case.
d. After emergence is complete, the number of: dead pupae (DP), dead adults on the water surface (DA), and live adults (AA) in each container are counted.
e. Calculate % Emergence Inhibition from collected pupa (% E.I.=% Control) for each container using the formula: % E.I.=(DP+DA)/(AA+DA+DP)×100.

Figure 3:
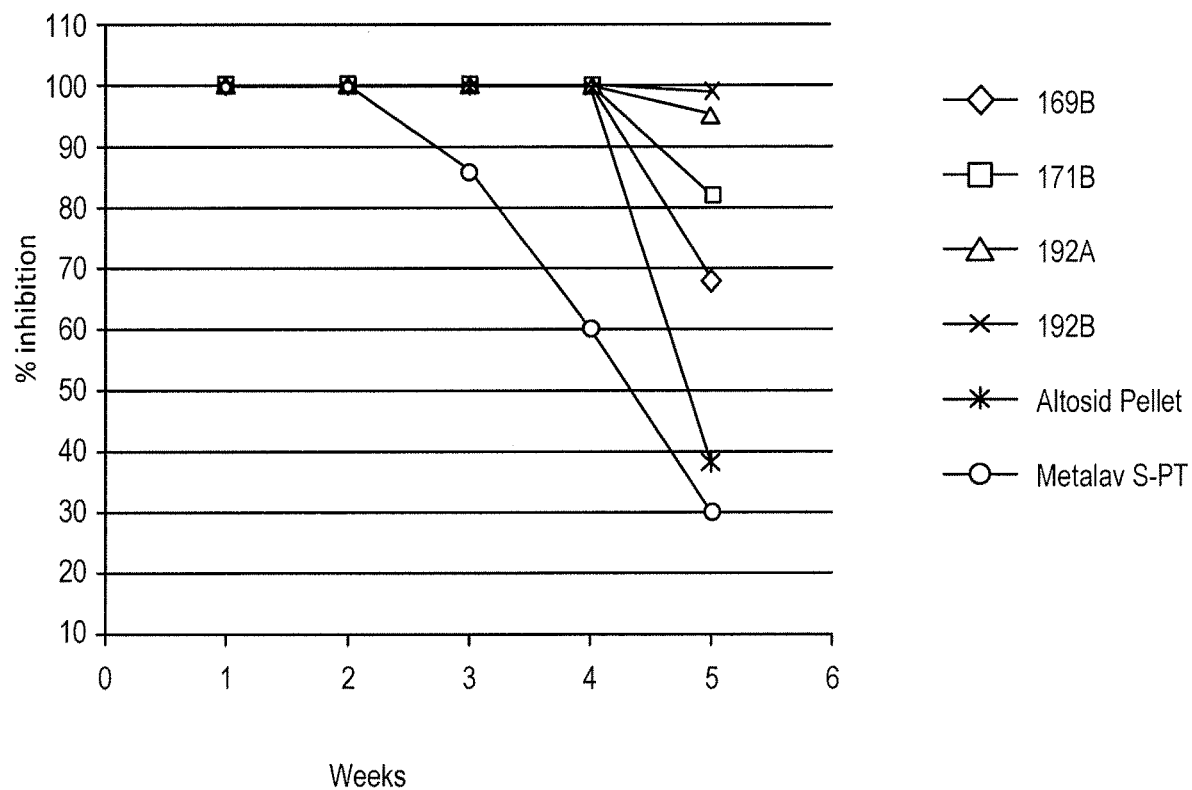

As is shown in Table 2 and FIG. 3, the inventive formulations of 169B, 171B, 192A and 192B have superior efficacy (inhibition) compared to the comparative formulations of Altosid and Metalav S-PT.

TABLE 3

| % Emergence Inhibition: | | | | | | |
| --- | --- | --- | --- | --- | --- | --- |
|  | 169B inventive | 171B inventive | 192A inventive | 192B inventive | Altosid pellet comparative | Metalav; S-PT comparative |
| 7 day inhibition | 100 | 100 | 100 | 100 | 100 | 100 |
| 14 day inhibition | 100 | 100 | 100 | 100 | 100 | 100 |
| 21 day inhibition | 100 | 100 | 100 | 100 | 100 | 86 |
| 28 day inhibition | 100 | 100 | 100 | 100 | 100 | 60 |
| 35 day inhibition | 68 | 82 | 95 | 99 | 38 | 30 |

As is shown in Table 3, the inventive formulations show superior inhibition at 35 days (5 weeks) compared to the comparative formulations. The superior inhibition of the inventive formulation is due to the extended release of the insecticide from the formulation.

All publications and patent applications cited in this specification are herein incorporated by reference as if each individual publication or patent application were specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. An extended release insecticide formulation for water applications having efficacy of 35-45 days, the formulation comprising:
  a matrix comprising 0.1% to 20% methoprene incorporated into a lipophilic wax applied on a substrate, the matrix further comprising a water erodible powder present at 55% to about 85% w/w, wherein the water erodible powder is calcium sulfate;
  a release retarding polymer present at 1% w/w to about 8% w/w together with a rate extending polymer present at 1% w/w to about 10% w/w uniformly embedded in the matrix; and
  polyvinyl alcohol (PVA) present at 1% to 15%, wherein the rate extending polymer is a water insoluble alginate within the formulation, which formulation is for use in water and having efficacy of 35-45 days.

2. The extended release insecticide formulation of claim 1, wherein the substrate is silica.

3. The extended release insecticide formulation of claim 1, wherein the lipophilic wax is a member selected from the group consisting of an animal wax, a vegetable wax, a petroleum wax, a hydrogenate vegetable oil, or a polyethylene polymer.

4. The extended release insecticide formulation of claim 1, wherein the lipophilic wax is present in about 1% to about 20% w/w.

5. The extended release insecticide formulation of claim 1, wherein the release retarding polymer is a member selected from the group consisting of guar gum, xanthan gum, polyurethanes, gelatins, hydroxypropylmethylcellulose, sodium carboxymethylcellulose, methylcellulose, ethylcellulose, hydroxyethyl cellulose, hydroxypropylcellulose, hydroxyethylmethylcellulose, and hydroxypropylethylcellulose, or a combination thereof.

6. The extended release insecticide formulation of claim 1, wherein the release retarding polymer is xanthan gum.

7. A method for eradicating an insect, the method comprising
contacting the insect with an extended release insecticide formulation according to claim 1; to thereby eradicate the insect.

8. The extended release insecticide formulation of claim 1, wherein the water insoluble alginate within the formulation is calcium alginate.

9. The extended release insecticide formulation of claim 1, wherein the formulation comprises:
14.5% w/w methoprene-wax silica;
73% w/w calcium sulfate;
1.5% w/w xanthan gum;
4.5% w/w sodium alginate; and
6.5% w/w polyvinyl alcohol (PVA).

10. The extended release insecticide formulation of claim 9, wherein the formulation comprises: 1-8% w/w methoprene.

* * * * *